May 4, 1943.  O. V. STEPHENSON  2,318,021
FILM CHANGE-OVER WARNING DEVICE
Filed May 13, 1942
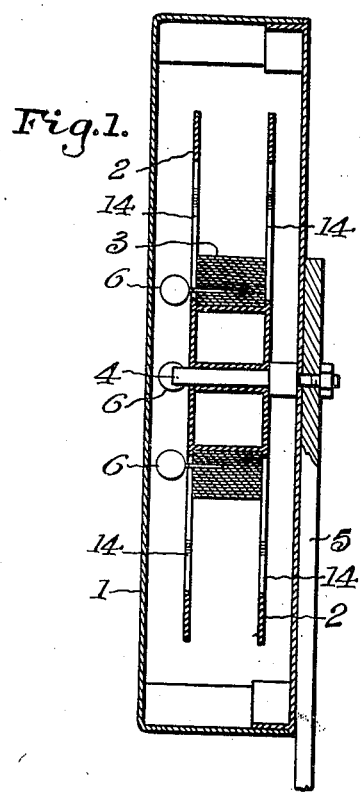
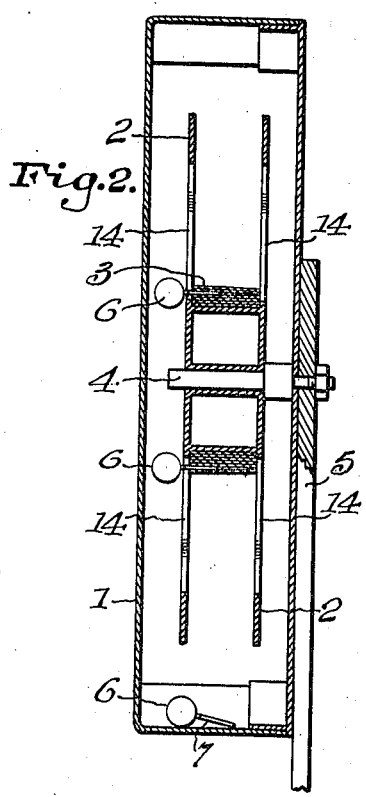
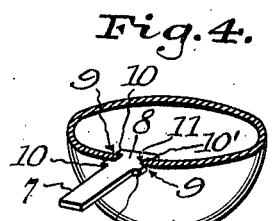
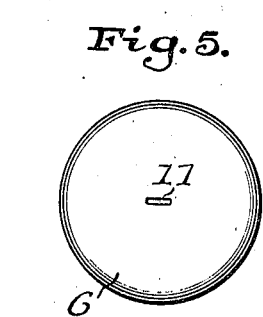
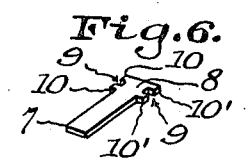
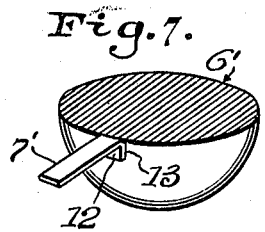
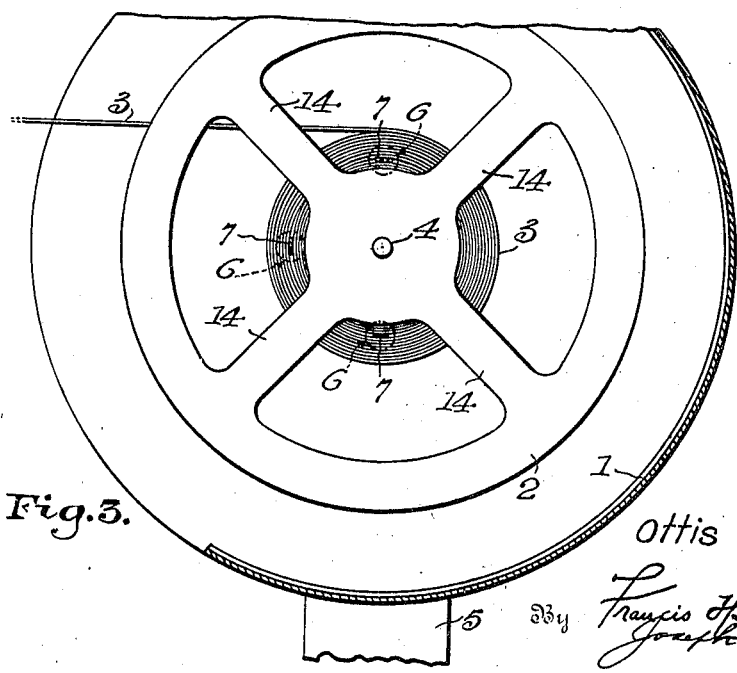
Inventor
Ottis V. Stephenson
Attorneys Patented May 4, 1943

2,318,021

UNITED STATES PATENT OFFICE 2,318,021

FILM CHANGE-OVER WARNING DEVICE

Ottis V. Stephenson, United States Army

Application May 13, 1942, Serial No. 442,799

3 Claims. (Cl. 116—67)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a film change-over warning or caution device for motion picture projectors, and the primary object thereof is to provide means for producing an audible indication when the film on one projector has been unwound to a point where it is almost necessary to make a change-over to another projector.

Another object of the invention is to provide a film change-over warning device which is carried by a film of a motion picture projector and adapted to be released through the unwinding of the film to give an audible indication when all but a predetermined length of film has been unwound from a reel, whereby the operator of the projector will be notified of the amount of time before he must make a change-over to another projector.

Another object of the invention is to provide a film change-over warning device of such construction that it may be mounted on a film of a motion picture projector and released by the film as it is unwound from a reel for producing an audible indication warning the projectionist that the film will soon be unwound from the reel and it is about time to change over to another projector.

Briefly stated, the invention consists of a film change-over warning device comprising a weighted member having a tongue mounted thereon which extends out from the weighted member, the tongue on the weighted member being adapted to be placed between a convolution of a film and when all but a predetermined length of the film has been unwound from a reel, the change-over warning device is caused to fall down into a magazine of a motion picture projector, thus producing an audible indication for warning the operator of the projector that it is almost time to change over to a film on another projector.

With the above and other objects and advantages in view, the invention consists of certain features of construction and arrangement of the several parts to be hereinafter fully described and illustrated in the accompanying drawing, in which Fig. 1 is a central vertical sectional view partly in elevation through a conventional type of film reel and its housing of a motion picture projector, and having a plurality of the improved film change-over warning devices mounted on the film;

Fig. 2 is a similar view with a part of the film removed from the reel and showing one of the film change-over warning devices in a fallen position within the housing after having dropped to the bottom of the housing for giving an indication that it is about time to change over to another projector;

Fig. 3 is a fragmentary side elevation, partly in section, of the film reel mounted in its housing, showing the improved film change-over warning devices mounted in different convolutions on the film;

Fig. 4 is a perspective sectional view, partly in elevation, of one form of a film change-over warning device including a weighted member having a tongue mounted thereon;

Fig. 5 is a side elevation of the weighted member illustrated in Fig. 4 with the tongue removed therefrom;

Fig. 6 is a perspective view of the tongue of the film change-over warning device illustrated in Fig. 4; and Fig. 7 is a perspective sectional view of a modified form of improved film change-over warning device.

Referring more specifically to the drawing, 1 designates a magazine or housing in which a film reel 2 is removably mounted. The film reel 2 has a film 3 wound thereon and is rotatably mounted on the shaft 4 carried by a bracket 5.

The film 3 may carry a plurality of the improved film change-over warning devices, but only one is sufficient for producing an audible indication. Each of said change-over warning devices may comprise a hollow weighted member 6 in the form of a sphere as illustrated in Figs. 4 and 5, or a solid weighted spherical member 6' as illustrated in Fig. 7. The hollow weighted member 6 has a tongue or projection 7, made of any suitable material such as rubber or leather, mounted thereon. One end 8 of the tongue 7 is substantially H-shaped, having diametrically opposite grooves 9 and pairs of ears or projections 10 and 10' which extend in opposed relation to each other from the opposite longitudinal side edges of the tongue. The H-shaped end portion 8 of the tongue 7 is inserted in a slot 11 formed in the hollow member 6, with the portions of the member 6 adjacent the ends of the slot 11 engaging the grooves 9 and with the outer ears at the end of the tongue abutting against the inner surface of the hollow member, and the ears adjacent to the end of the tongue abutting against the outer surface of the member whereby the tongue 7 is securely held on the hollow member 6. The inner end 12 of the tongue 7' in the modified form of film change-over warning device illustrated in Fig. 7 is secured at 13 in any suitable manner to the solid weighted member 6'. The free ends of the tongues 7 or 7' of the members 6 and 6', respectively, extend outwardly from the members 6 and 6' and are caused to engage between some of the convolutions of the film 3 close to the inner end thereof, with the weighted members 6 or 6' being spaced around the film and extending between the spokes 14 on one side of film reel 2. By making the tongues 7 and 7' of rubber or leather, the film 3 is prevented from being scratched or damaged in any way.

In operation, after the film 3 is wound on the film reel 2 to a depth, for instance, of one-half inch, the tongues 7 or 7' on the members 6 and 6' are placed on the film and the film then wrapped on the tongues whereby the film change-over warning devices are held on the film. When all but a predetermined length of the film 3 has been unwound from the reel 2 represented by the points where the film change-over warning devices are placed on the film, the members 6 or 6' are caused to drop to the bottom of the magazine or housing 1 and, as they are preferably made of metal, the sound made in dropping to the bottom of the magazine gives a warning or audible signal that the film is getting close to the point where it is necessary to stop the operation of the projector and start to change over to another projector.

It will thus be seen that there is herein provided a novel and efficient form of film change-over warning device which is well adapted for the purpose intended. Even though certain features of construction and operation of parts have been shown and described, it is nevertheless to be understood that various changes may be made therein without departing from the spirit or scope of the invention.

Having described my invention, what I claim as new and wish to secure by Letters Patent is:

1. In combination, a reel, a film wound on the reel, and means supported solely by and between certain of the convolutions of the film, said means adapted to be released through the unwinding of the film when all but a predetermined length of the film has been unwound and to strike a sounding member to give an audible warning.

2. In combination, a film reel, and means carried solely by and between convolutions of the film and adapted to be released through the unwinding of the film when all but a predetermined length of the film has been unwound and to strike a sounding member to give an audible warning, said means including a weighted portion and a projecting portion, said projecting portion placed between said convolutions of the film.

3. In combination, a housing, a film reel revolvably mounted in the housing, and means supported solely by the film and adapted to be released through the unwinding of the film when all but a predetermined length of the film has been unwound from the reel, said means including a weighted portion and a projecting portion extending from said weighted portion, said projecting portion adapted to be placed between convolutions of the film, and said weighted portion adapted to strike said housing when the predetermined length of film has been reached, said housing being adapted to give an audible signal when struck by said means.

OTTIS V. STEPHENSON.